Figure 1:
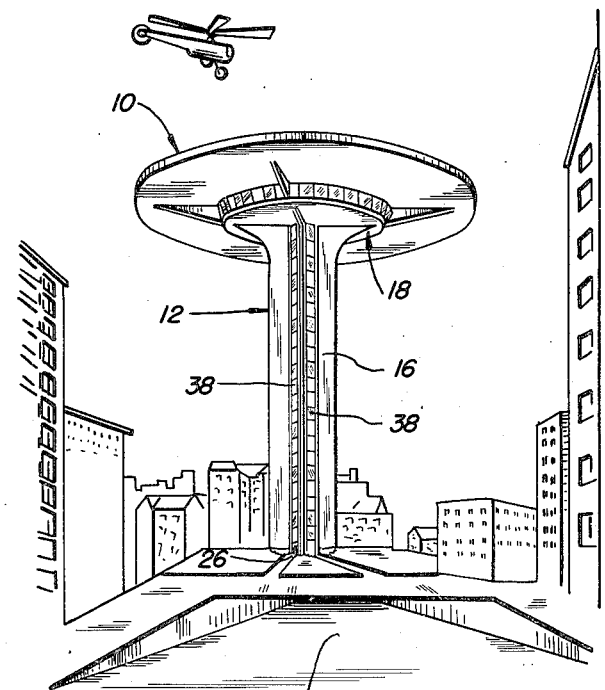

Sept. 6, 1949.    L. G. REDSTONE    2,481,343
HELICOPTER STATION

Filed Jan. 3, 1947    3 Sheets-Sheet 1

INVENTOR.
LOUIS G. REDSTONE.
BY
Parker and Burton.
ATTORNEYS.

Sept. 6, 1949.  L. G. REDSTONE  2,481,343
HELICOPTER STATION

Filed Jan. 3, 1947  3 Sheets-Sheet 2

INVENTOR.
LOUIS G. REDSTONE.
BY
Parker and Burton
ATTORNEYS.

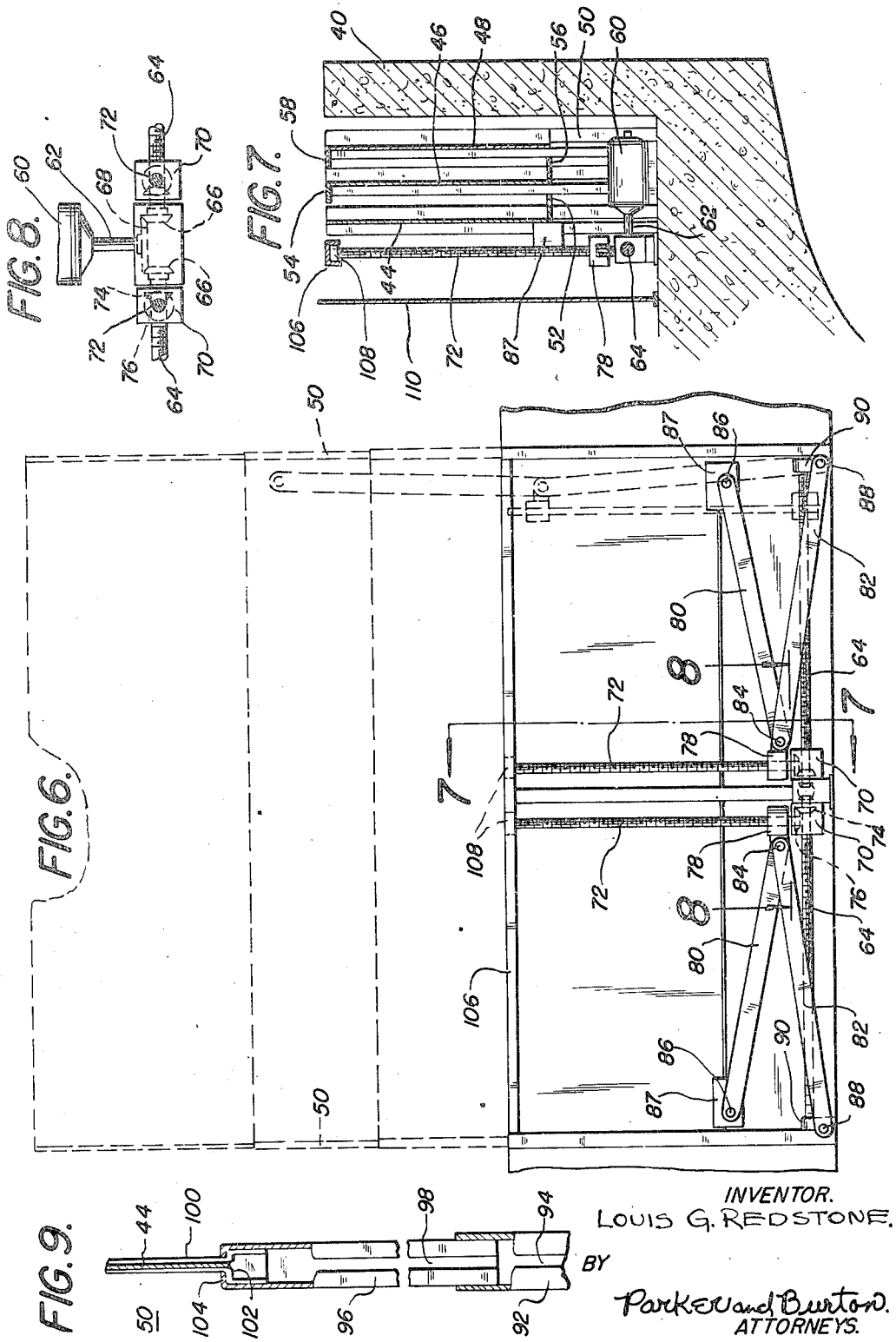

Patented Sept. 6, 1949

2,481,343

UNITED STATES PATENT OFFICE 2,481,343

HELICOPTER STATION

Louis G. Redstone, Detroit, Mich.

Application January 3, 1947, Serial No. 720,012

7 Claims. (Cl. 244—114)

This invention relates to aircraft structures and particularly to helicopter landing and take-off structures adapted for use in congested metropolitan areas.

An important object of this invention is to provide an improved landing and take-off structure for aircraft and particularly helicopters which is constructed in a novel manner so as to enable helicopters and similar types of aircraft to land and take-off in congested metropolitan areas without interfering with ground traffic or adjacent buildings. Another important object of the invention is to provide an elevated platform to serve as a terminal for helicopters which although it has an extensive landing area capable of overlying low buildings yet is supported directly from the ground by novel means occupying a minimum amount of ground area. A further important object of the invention is to provide an improved self-supported elevated aircraft landing and take-off structure adapted for congested metropolitan areas, which although rugged and strong in construction is economical to erect.

An important feature of the invention is the provision of a high platform structure for aircraft landings and take-offs which is structurally supported upon an underground foundation shaped to provide parking areas for automobiles and other forms of ground transportation. Another important feature of the invention is the provision of a floor level immediately under the landing platform which is provided with facilities for the comfort and convenience of passengers, visitors and airline personnel. A further important feature of the invention is the provision of a relatively narrow elongated structural shaft or column for supporting the landing platform at an elevated height which occupies a minimum of cross-sectional area throughout its height and is provided with elevators for carrying passengers and freight from the bottom of the column to the top thereof and return.

In particular, other features of the invention relate to the generally circular character of the landing platform and the supporting column, the latter extending downwardly vertically from the platform in axial alignment therewith. The column is relatively narrow in cross-sectional area, having a radial dimension less than one third that of the platform. Preferably for strengthening and rigidifying purposes the column is provided with laterally projecting buttresses or ribs which extend the length of the column and are spaced equally circumferentially therearound. At the juncture of the top of the column with the platform, the buttresses flare outwardly and assist in supporting a floor level immediately below the platform where facilities for servicing helicopters and for the convenience of passengers and visitors may be located. This floor level is preferably enclosed by glass or other transparent medium which extends in contiguous relation around all sides thereof. Preferably this enclosed floor level is wider than the column but less in width than the platform and is generally circular in formation.

Another important object of the invention is to provide a novel form of wind break for the landing platform which is mounted in the rim portion thereof and may be collapsed entirely out of view or adjusted to various heights to reduce the velocity of the wind over the landing area. This novel wind break is divided into sections around the perimeter of the platform and is so constructed that each section contains a plurality of screens capable of being raised in slightly overlapping relation to various heights above the platform. Novel power means is employed to expeditiously raise and lower the screens.

Figure 2:
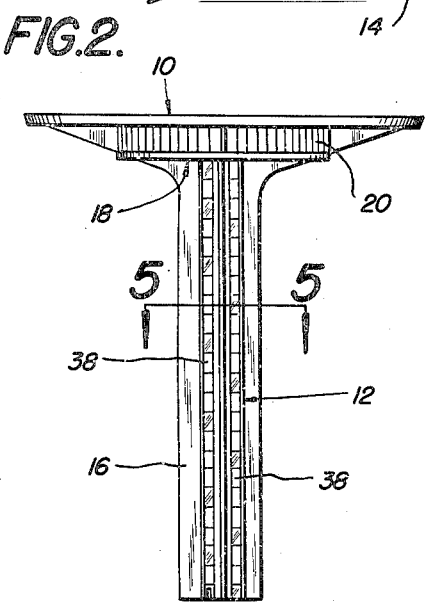
Figure 3:
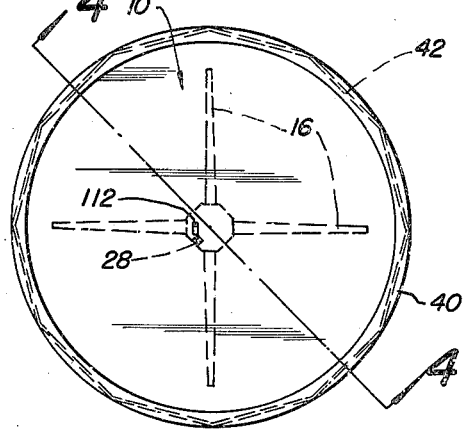
Figure 4:
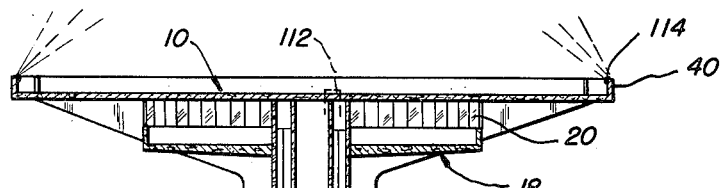

Various other objects, advantages and meritorious features will become more fully apparent from the following specification, appended claims and accompanying drawings wherein:

Fig. 1 is a perspective view of a structure constructed in accordance with this invention from a level adjacent to the ground showing the manner in which it may be located in a congested metropolitan area, Fig. 2 is a side elevation of the structure above the ground level, Fig. 3 is a top plan view of the structure of Figs. 1 and 2, Fig. 4 is a vertical cross-sectional view through the structure taken along line 4—4 of Fig. 3.

Figure 5:
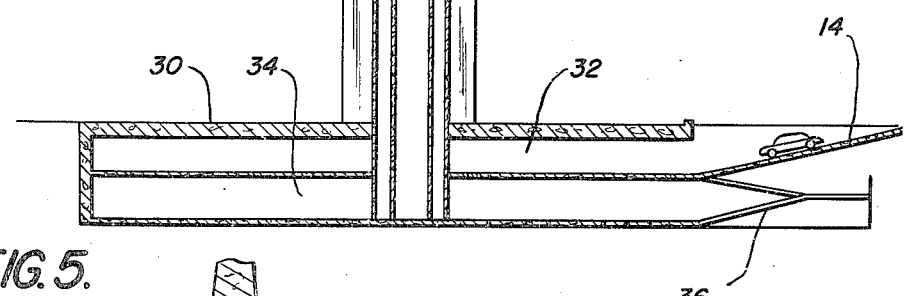

Fig. 5 is a horizontal sectional view of the structure taken along line 5—5 of Fig. 2, Fig. 6 is a side elevation of one windbreak unit, Fig. 7 is a vertical sectional view along line 7—7 of Fig. 6, Fig. 8 is an enlarged detail sectional view along line 8—8 of Fig. 6, and Fig. 9 is a side elevation of one of the side supporting means for the screens of the windbreak, partly broken away to show the interior construction.

In the embodiment of the invention illustrated in the drawings, the aircraft landing and take-off structure is pictorially represented in Fig. 1 as being located in a congested metropolitan area surrounded by buildings. Preferably, as shown in this figure, the structure is supported upon the ground in a small park area or in the middle of a wide parkway between relatively high buildings. In general, the structure comprises an elevated platform generally indicated at 10 preferably circular in character but may be polygonal in formation. The platform is supported upon the upper end of a vertical shaft or column generally indicated at 12 which is relatively narrow in width as compared with the platform and extends to the ground from the center of the platform where the base is supported in an underground foundation. In the foreground in Figure 1 is a downwardly inclined ramp 14 leading to an automobile parking area formed in the interior of the column's foundation.

The structure of this invention is intended primarily for the landing and the taking off of helicopter-type aircraft within a congested area in a large city and to serve as a terminal for short feeder lines to outlying airports. In most cities the tops of large buildings are unsuitable for this purpose and moreover they are not constructed to handle the "traffic." The present structure provides an elevated landing and take-off platform at a considerable height above the ground where it is out of the way of ground traffic and may overlie low surrounding buildings. It is high enough to be above the irregular ground sweeping gusts of wind created by the street channels between the buildings yet sufficiently close to the ground to expedite up and down movement of passengers and freight between the platform and the ground.

Preferably, the dimension of the platform 10 is approximately 150 to 200 feet in diameter. The column 12 is preferably approximately 200 feet high and in general the column height approximates the diameter of the platform, although it is understood this proportion may be varied depending on local conditions. Although the width of the column may be of various dimensions it is preferred to have it approximately 40 feet wide throughout the major portion of its length. If the diameter of the platform is 150 feet, a column width of 40 feet is less than one third the lateral extent of the platform. For wider platform this ratio may even be less.

The exterior of the column 12 may be round or provided with a series of flat sides circularly arranged around its axis as shown in Fig. 5. To strengthen the column for the support of the platform it is preferred to provide a series of vertical buttressess or ribs 16 spaced equal distances circumferentially around the column. Four such buttresses are shown in the illustrated embodiment of the invention and as shown they extend from the ground to the platform. As they approach the platform it is preferred to flare the buttresses outwardly as shown in Figs. 1 and 2 until they extend almost to the perimeter of the platform. The column and buttresses may be formed of reinforced concrete or other suitable structural materials.

Immediately below the platform and in the area of the outwardly flared sections of the buttresses 16 a floor level is provided which is generally indicated at 18. The major portion of the outer side walls of this floor are preferably formed of transparent members 20 such as glass panes or other suitable transparent medium which are in substantial contiguous relation to one another completely around the structure. Preferably the floor 18 is circular to correspond with the circular formation of the platform but may be of the same polygonal formation as the platform if the latter is constructed in this manner. Moreover, from the standpoint of support as well as architectural design it is preferred to have the floor level 18 extend laterally approximately one half the lateral dimension of the platform. The flared sections of the buttresses extend through the floor level throughout their radial extent and divide the space between the floor and the underside of the platform into four quarter sections. These sections may be further subdivided into rooms in which may be located a restaurant, quarters for servicing helicopters and for airline personnel, and waiting and rest rooms for the passengers and visitors.

The shaft or column 12 is preferably hollow as shown in Fig. 5 and may be constructed with vertical shaftways 22 for elevators 24 in which passengers and freight are raised and lowered. Three banks of elevators are shown occupying three sides of a quadrangle around the axis of the column. Each bank may contain one or more elevator shaftways, two being shown in each bank in the illustrated embodiment of the invention. An elevator shaftway on the fourth side of the quadrangle is preferably omitted in order to provide a lobby entrance 26 at the base of the column, and a spiral or zigzag stairway such as that indicated at 27 in Fig. 5 for emergency purposes may extend from the ground to the floor level 18 on this side of the column. Any suitable means may be provided for gaining access to the platform from the floor 18 such as the stair case indicated at 28 in Fig. 5.

For this type of structure a relatively wide and deep foundation is required. Preferably this foundation is made wider than necessary and hollowed out to provide large parking areas for automobiles. Referring to Fig. 4 the foundation indicated at 30 is open in the interior to form a large automobile parking area 32. The foundation is preferably located wholly below the ground level and for gaining access thereto the ramp 14 previously described may be used. If desired, additional parking levels below that shown at 32 may be built into the foundation to accommodate more vehicles such as the lower parking level 34 connected by ramp 36 to the parking area 32. If the structure is erected upon a vehicle parkway, a part of the parkway may run completely through the foundation from one side to the other and provide facilities for embarking and discharging passengers from busses and similar forms of transportation.

For architectural design purposes as well as for providing light, it is desired to provide several vertical series of windows running the length of the column 12 and spaced therearound preferably along the elevator shaftways. As shown in Figs. 1, 2 and 5, each window series is indicated by the reference numeral 38 and as previously mentioned they are preferably mounted in the side portions of the column opposite to the elevator and stair shaftways as shown in Fig. 5. Except for the bottom and top members of each window frame, the window openings are in substantially contiguous relation from the ground level to the upper floor 18 of the column. Any suitable light permeable material may be used to close the window openings, either transparent or translucent glass or plastic panes being suitable for this purpose. The movement of the elevators up and down their respective shaftways will be visible from the outside of the structure and form a highly attractive feature of the design.

The land and take-off platform 10 is preferably provided with a peripheral wall 40 rising above the level of the platform and extending completely therearound. The wall serves as a protecting barrier or guard rail and in addition as a partial windbreak. Preferably it is desired to provide novel means which is optionally controllable and which is capable of rising to various heights above the wall 40 to more substantially serve as a windbreak for reducing the wind currents immediately over the platform 10. This means comprises a series of vertically movable screens located slightly inwardly of the wall 40 and around the platform. The windbreak is divided into a series of screen units which extend straight for relatively short distances and are arranged in a series of connected chords around the platform as indicated in dotted outline at 42 in Fig. 3.

Figs. 6, 7 and 8 illustrate a suitable screen unit for windbreak purposes, and it is understood a series of these units are arranged completely around the platform immediately inside the protecting barrier 40. Each unit illustrated herein comprises three screen sections indicated by the reference numerals 44, 46 and 48 respectively. These screen sections are mounted in parallel slightly spaced apart relationship and generally parallel to the immediate portion of the wall 40 alongside which the screens are mounted. Each screen is mounted in frames which in turn are mounted for vertical movement in opposed channel-shaped guiding tracks generally indicated at 50—50 which overlap the opposite side edges of the screen and are telescopingly mounted for extension and retraction with their respective screen as shown in Figs. 6 and 9. One screen of the three may serve as a master screen controlling the raising of the other two. In the illustrated embodiment of this invention the innermost screen 44 is used for this purpose. After the lower end of this screen reaches the upper level of the wall 40 it engages and picks up the next outermost screen 46. After the lower end of the latter reaches the upper level of the wall 40, it similarly engages and picks up the outer screen 48. Preferably this operation is performed by providing in the lower edge of the screen 44 an outwardly projecting flange 52. On the upper edge of the screen 46 an inwardly projecting flange 54 is provided which extends into the path of travel of the flange 52. Similarly the lower edge of the screen 46 and the upper edge of the screen 48 are provided with overlapping flanges 56 and 58 respectively for this purpose.

Each screen unit is preferably operated by power means such as the electric motor indicated at 60 located on the platform under the screens. The drive shaft 62 of this motor projects inwardly and is operatively connected to a screw shaft and linkage system for raising the innermost screen 44. This system comprises a pair of horizontally aligned screw shafts 64—64 projecting away from opposite sides of the drive shaft 62 as shown in Fig. 6. The inner ends of the screw shafts 64—64 are provided with bevel gears 66—66 which engage a bevel gear wheel 68 fixed on the drive shaft. Mounted on each screw shaft is a traveling nut 70. Each nut carries a vertical extending screw shaft 72 which is rotated simultaneously with the screw shafts 64—64. This is accomplished by providing in each traveling nut a pair of bevel gears 74 and 76 which engage one another and are fixed respectively to the screw shaft 64 and the screw shaft 72. Similarly provided on each vertical screw shaft 72 is a traveling nut 78. It is evident that when the screw shafts 64—64 are rotated by the motor, the nuts 70 therein will travel therealong either outwardly or inwardly thereof and carry the vertical screw shafts 72 therewith. Simultaneously as these movements occur, the nuts 78 on the vertical screw shafts will travel up or down their respective shafts.

Secured to each vertical traveling nut 78 are a pair of links or levers 80 and 82 which are pivotally connected thereto about a common horizontal axis 84. These links in the lower position of the screen 44 extend outwardly away from the nut in a slightly diverging relation as shown in Fig. 6. The outer remote end of each link 80 is pivotally connected at 86 to a bracket 87 mounted on the outer margin of the screen 44. The outer remote end of each link 82 is pivotally connected to a fixed bracket 90 located at the base of each track 50. The operation of the links is readily apparent. As their inner pivoted ends 84 travel up the screw shafts 72 and outwardly therewith as the latter move along the screw shafts 64—64, the links are caused to diverge further apart until they are almost in vertical alignment as shown in dotted outline at the right in Fig. 6. Since the pivotal connection 86 of each link is attached to the screen 44 this diverging movement will raise the screen until its maximum height is reached when the links are in the dotted position. During its upward movement to its maximum height, the screen 44 will successively raise the screens 46 and 48 forming a windbreak above the upper level of that section of the wall 40 along which the screen unit is disposed. The electric motors may be controlled in the conventional manner by electric switches of the push button type and the height at which the screens are raised may be governed by the length of time the operating push button is depressed. Any one or all of the motors 60 may be operated from a central control board located on the floor level 18.

To guide and support the screens in their vertical movements it is preferred to employ the telescoping side supports generally indicated at 50 which are capable of collapsing with the screens to a level below the upper edge of the wall 40 where they will be out of sight. Each telescoping side support comprises a bottom fixed channel shaped member 92 (Fig. 9), the side flanges of which are bent inwardly toward one another but terminate short of engagement to form an elongated vertical slot 94. Slidably telescopingly received in this fixed member is a second channel shaped member 96 which is similarly shaped to provide an elongated vertical slot 98. Each side margin of the screen is provided with an overlapping channel shaped support 100 which is of a size to slidably fit the slots 94 and 98. Each screen support 100 may be widened at its lower end as shown in Fig. 9 to slidably fit the interior of the channel member 96 and at the same time provide a shoulder 102 which will engage the underside of the lapped over end 104 of the member 96. In the raising of the screens as the bottom ends thereof clear the upper level of the wall 40, they will pick up and carry the intermediate channel member 96 therewith. For the screen that is raised the least, such as screen 48 in the illustrated embodiment of the invention, the intermediate channel supporting member 96 may be omitted.

At the maximum height of the screens, the bottom ends of the intermediate channel members 96 are still retained within the fixed channel members 92 for support therefrom as shown in Fig. 9. When lowered, the screens and the intermediate supporting members 96 collapse within the plane of the fixed members 92 and are inconspicuously supported for immediate use below the level of the wall 40. The mechanism herein illustrated and described typifies one manner of raising and lowering windbreak screens in successive order and it is understood that other suitable means may be used if desired. The windbreak screens themselves may be made and constructed of any suitable material for the purpose. They may be of lattice type or otherwise apertured to decrease the wind resistance thereagainst.

The upper ends of the vertical screw shafts 72—72 are preferably guided in a horizontal track which may be an inverted channel shaped member shown at 106 extending the length of the screen unit. Bearings 108 on the upper ends of the shafts may be provided to slide with the track 106 and at the same time to permit the shafts to rotate on their respective axes. To protect the screen units from the inside area of the platform 10, it is preferred to provide a barrier 110 which as shown rises to the approximate height of the wall 40 and generally parallels the wall completely around the perimeter of the platform in spaced relation thereto.

In addition to the stair case 28 provided between the platform 10 and the floor level 18, an hydraulic lift 112 or other form of elevator may be provided for transporting passengers and freight between these two levels. Beacon lights, either of a fixed or turnable character, may be mounted on the wall 40 of the landing platform as indicated at 114 in Fig. 4.

What I claim is:

1. A helicopter landing and take-off structure comprising, in combination, a generally circular platform having an area such as to accommodate a plurality of helicopters, a single relatively narrow hollow column located below the platform in axial alignment with the center thereof and forming the sole means for supporting the platform at a substantial height above the ground, an underground supporting foundation for the column located below the base of the column and being hollowed out to provide one or more automobile parking areas therein, a ramp leading upwardly from the parking areas and opening out on the ground level at one side of the column up and down which automobiles may travel to and from the parking areas, and one or more elevators in the column for carrying passangers and freight from the parking areas in the underground supporting foundation to the top of the column.

2. A helicopter landing and take-off structure comprising, in combination, a platform of generally circular formation and having an area such as to accommodate a plurality of helicopters, a single relatively narrow hollow column of generally circular formation forming the sole means for supporting the platform at a substantial elevation above the ground, said column extending in axial alignment with said platform and having a radial dimension less than one-third that of the platform, a lobby entrance in the column on the ground level, a floor level disposed immediately below the platform having a generally circular formation and a radial dimension approximately half that of the platform and arranged coaxially therewith, an underground foundation for the column of a lateral extent approximating that of the platform, said foundation being hollowed out for the major portion of its lateral dimension to provide one or more automobile parking areas therein communicating with ground level by an inclined passageway at least on one side of the column, and one or more elevator shaftways in said column in each of which an elevator is provided, said shaftways extending the length of the column and opening at their upper end into said floor level immediately below the platform and at their lower ends into said parking areas of the foundation.

3. A helicopter landing and take-off structure comprising, in combination, a platform of generally circular formation having an area such as to accommodate a plurality of helicopters, a single relatively narrow elongated column of generally circular formation extending in axial alignment with the platform between the same and the ground and forming the sole means for supporting the platform at an elevated height, said column having a length approximating the diameter of the platform and a radial dimension less than one third that of the platform, buttresses projecting radially from the column arranged in equal circularly spaced relation around the column and extending the length of the column, the upper end sections of said buttresses flaring out so as to supportingly engage the underside of the platform adjacent to its perimeter, an underground foundation disposed under said column and supporting the same and platform, said foundation being of considerable lateral extent and opened in the interior thereof to provide one or more passages for ground vehicles, and one or more downwardly inclined vehicle ramps leading from the ground level at one or more sides of the column into the passages of the foundation.

4. A helicopter landing and take-off structure comprising, in combination, a platform of generally circular formation having an area such as to accommodate a plurality of helicopters, a single relatively narrow elongated hollow column of generally circular formation extending in axial alignment with the platform between the same and the ground and forming the sole means for supporting the platform at an elevated height above the ground, said column having a length approximating the diameter of the platform and a radial dimension less than one third that of the platform, buttresses projecting from the sides of the column arranged in equal spaced relation around the column and extending the full length thereof, said buttresses projecting equal distances externally from the sides of the column and flaring outwardly at their upper ends to supportingly engage the underside of the platform adjacent to its perimeter, a floor level of generally circular formation disposed immediately below the platform in coaxial relation thereto and in the area of said outwardly flaring ends of said buttresses, a plurality of vertical shaftways in said column arranged in circularly spaced relation around the axis of the column and in alternate relation to said buttresses, said shaftways extending the full length of the column between the ground level and said floor level, said column provided with a vertical opening in each side thereof opposite to each shaftway extending the full length of the column and closed by light permeable members arranged in substantially vertical contiguous relation the full length of the column, and light permeable members arranged in substantially side-by-side contiguous relation around the perimeter of said floor level and enclosing the area between the same and the platform.

5. A helicopter landing and take-off structure comprising, in combination, a platform of generally circular formation having an area to accommodate a plurality of helicopters, a single relatively narrow elongated column of generally circular formation extending in axial alignment with the platform between the same and the ground and forming the sole means for supporting the platform at an elevated height, a peripheral wall extending around the edge of the platform and rising thereabove, a series of windbreak members located immediately inwardly of the wall below the lever thereof and following the wall completely around the platform, and means for raising the windbreak members to a height above the level of the wall and lowering the same below the level of the wall.

6. A helicopter landing and take-off structure comprising, in combination, a platform of generally circular formation having an area such as to accommodate a plurality of helicopters, single relatively narrow elongated column of generally circular formation extending in alignment with the center of the platform between the same and the ground and forming the sole means for supporting the platform at an elevated height above the ground, said column having a length approximating the diameter of the platform and a radial dimension less than one third that of the platform, a peripheral wall of low height extending around the edge of the platform, a series of windbreak units extending around the platform immediately inwardly of said wall, each unit including at least two windbreak screens arranged in opposed parallel relationship to one another and generally parallel to the section of the wall opposite which they are disposed, said windbreak screens in inoperative position extending no higher than the level of the wall and power means for raising each screen of each windbreak unit to a different height above the level of the wall.

7. A helicopter landing and take-off structure comprising, in combination, a platform of generally circular formation having an area such as to accommodate a plurality of helicopters, a single relatively narrow elongated column of generally circular formation extending in alignment with the center of the platform between the same and the ground and forming the sole means for supporting the platform at an elevated height above the ground, said column having a length approximating the diameter of the platform and a radial dimension less than one third that of the platform, a peripheral wall of low height extending around the edge of the platform, a series of windbreak units extending around the platform immediately inwardly of said wall, each unit including at least two windbreak screens arranged in opposed parallel relationship to one another and generally parallel to the section of the wall opposite which they are disposed, said windbreak screens in inoperative position extending no higher than the level of the wall, means for raising one screen of each windbreak unit so that the lower edge thereof is spaced above the top of the wall, and means automatically operable to raise another screen of each windbreak unit when the lower edge of said first screen thereof clears the top of the wall.

LOUIS G. REDSTONE.

REFERENCES CITED

The following references are of record in the file of this patent:

UNITED STATES PATENTS

| Number | Name | Date |
| --- | --- | --- |
| 1,746,101 | Carver | Feb. 4, 1930 |
| 2,066,776 | Bel Geddes | Jan. 5, 1937 |
| 2,215,773 | Workman | Sept. 24, 1940 |

FOREIGN PATENTS

| Number | Country | Date |
| --- | --- | --- |
| 22,528 | Great Britain | 1908 |
| 413,773 | Great Britain | July 26, 1934 |